US009366362B2

(12) United States Patent
Maki

(10) Patent No.: US 9,366,362 B2
(45) Date of Patent: Jun. 14, 2016

(54) SPRING-STYLE AIR BRAKE HOSE SUPPORT

(71) Applicant: Ireco, LLC, Bensenville, IL (US)

(72) Inventor: Brian G. Maki, Wood Dale, IL (US)

(73) Assignee: Ireco, LLC, Bensenville, IL (US)

( * ) Notice: Subject to any disclaimer, the term of this patent is extended or adjusted under 35 U.S.C. 154(b) by 56 days.

(21) Appl. No.: 14/102,049

(22) Filed: Dec. 10, 2013

(65) Prior Publication Data
US 2015/0158479 A1   Jun. 11, 2015

(51) Int. Cl.
| | |
|---|---|
| *F16L 3/01* | (2006.01) |
| *F16F 1/04* | (2006.01) |
| *B60T 17/04* | (2006.01) |
| *F16L 3/14* | (2006.01) |
| *F16L 55/00* | (2006.01) |
| *B61G 5/06* | (2006.01) |
| *B60D 1/62* | (2006.01) |
| *F16L 3/00* | (2006.01) |
| *B61G 7/02* | (2006.01) |
| *B61G 5/08* | (2006.01) |
| *F16L 3/205* | (2006.01) |
| *F16F 1/12* | (2006.01) |

(52) U.S. Cl.
CPC ... *F16L 3/01* (2013.01); *B60D 1/62* (2013.01); *B60T 17/043* (2013.01); *B60T 17/046* (2013.01); *B61G 5/06* (2013.01); *B61G 5/08* (2013.01); *B61G 7/02* (2013.01); *F16F 1/04* (2013.01); *F16F 1/128* (2013.01); *F16L 3/003* (2013.01); *F16L 3/14* (2013.01); *F16L 3/2053* (2013.01); *F16L 55/005* (2013.01); *F16F 2236/04* (2013.01); *Y10T 24/312* (2015.01)

(58) Field of Classification Search
CPC ................................. F16L 3/01; B60T 17/043
See application file for complete search history.

(56) References Cited

U.S. PATENT DOCUMENTS

| | | | | |
|---|---|---|---|---|
| 301,560 | A * | 7/1884 | Brooks | 278/96 |
| 600,548 | A * | 3/1898 | Moehn | 24/698.3 |
| 684,255 | A * | 10/1901 | Hughes | 248/61 |
| 1,426,176 | A * | 8/1922 | Gardner | 24/698.1 |
| 2,996,315 | A * | 8/1961 | Roth | F16L 3/00 137/349 |
| 3,344,935 | A * | 10/1967 | Stewart | B60T 17/046 213/1 R |
| 3,424,415 | A * | 1/1969 | Nadherny | 248/53 |

(Continued)

FOREIGN PATENT DOCUMENTS

| | | | | |
|---|---|---|---|---|
| GB | 720075 | A * | 12/1954 | F16L 3/2053 |
| GB | 943426 | A * | 12/1963 | F16L 3/2053 |

OTHER PUBLICATIONS

Paw-I-Trip, Chain links installation, Apr. 23, 2013, website: http://paws-i-trip.com/chain-links-installation/.*

(Continued)

Primary Examiner — Joshua J Michener
Assistant Examiner — Chiedu Chibogu
(74) Attorney, Agent, or Firm — Cook Alex Ltd.

(57) ABSTRACT

A spring-style railway hose support has a retraction-biased extension unit of a longitudinally compressible spring and a pair of oppositely directed internal wireforms within the longitudinally compressible spring. The internal wireforms engage respective ends of the longitudinally compressible spring, and a closed end of each is configured to allow it to project beyond a respective end of the longitudinally compressible spring. The retraction-biased extension unit is adapted to be directly or indirectly connected to a railway brake hose and to a railway car component that is positioned above the hose on a railway car.

23 Claims, 5 Drawing Sheets

(56) References Cited

U.S. PATENT DOCUMENTS

| | | | |
|---|---|---|---|
| 3,784,030 A * | 1/1974 | Chierici | 213/76 |
| 3,860,226 A * | 1/1975 | Hensiek, Jr. | F16F 1/128 |
| | | | 267/69 |
| 3,941,254 A | 3/1976 | Sweger | |
| 4,069,836 A * | 1/1978 | Sowinski | 137/348 |
| 4,485,998 A * | 12/1984 | Kowalski | F16L 3/2053 |
| | | | 248/561 |
| 4,519,564 A | 5/1985 | Nadherny | |
| 4,886,404 A | 12/1989 | Jensen et al. | |
| 4,986,500 A * | 1/1991 | Campbell | F16L 3/01 |
| | | | 213/76 |
| 5,009,386 A * | 4/1991 | Berger | F16L 3/2053 |
| | | | 248/59 |
| 5,208,937 A * | 5/1993 | Cooper | B08B 9/055 |
| | | | 134/8 |
| 5,575,446 A * | 11/1996 | Swenson et al. | 248/304 |
| 5,833,482 A * | 11/1998 | Buchter | B60T 17/043 |
| | | | 439/191 |
| 5,887,850 A | 3/1999 | Ruffalo | |
| 5,971,442 A | 10/1999 | Kozinski et al. | |
| 6,290,238 B1 | 9/2001 | Johnson, Jr. | |
| 6,422,521 B1 | 7/2002 | Tinklepaugh et al. | |
| 6,474,675 B1 * | 11/2002 | Bockman | B60D 1/182 |
| | | | 267/138 |
| 6,669,237 B1 | 12/2003 | Burch et al. | |
| 6,871,732 B2 | 3/2005 | Flint et al. | |
| 7,267,306 B2 | 9/2007 | Eason et al. | |
| 7,467,812 B2 | 12/2008 | Ring et al. | |
| 7,739,775 B2 * | 6/2010 | Shimanski | 24/265 H |
| 7,850,128 B2 | 12/2010 | Murphy | |
| 8,167,251 B2 | 5/2012 | Murphy et al. | |
| 8,201,779 B2 | 6/2012 | Hua et al. | |
| 8,276,853 B2 | 10/2012 | Murphy | |
| 2006/0043731 A1 * | 3/2006 | Sommerfeld | B60D 1/62 |
| | | | 285/65 |
| 2007/0227999 A1 * | 10/2007 | Murphy | 213/76 |

OTHER PUBLICATIONS

VirginiaTech_Fencing materials for livestock systems—Virginia Cooperative Extension, Aug. 10, 2009, Website: http://web.archive.org/web/20090810145220/http://pubs.ext.vt.edu/442/442-131/442-131.html.*

* cited by examiner

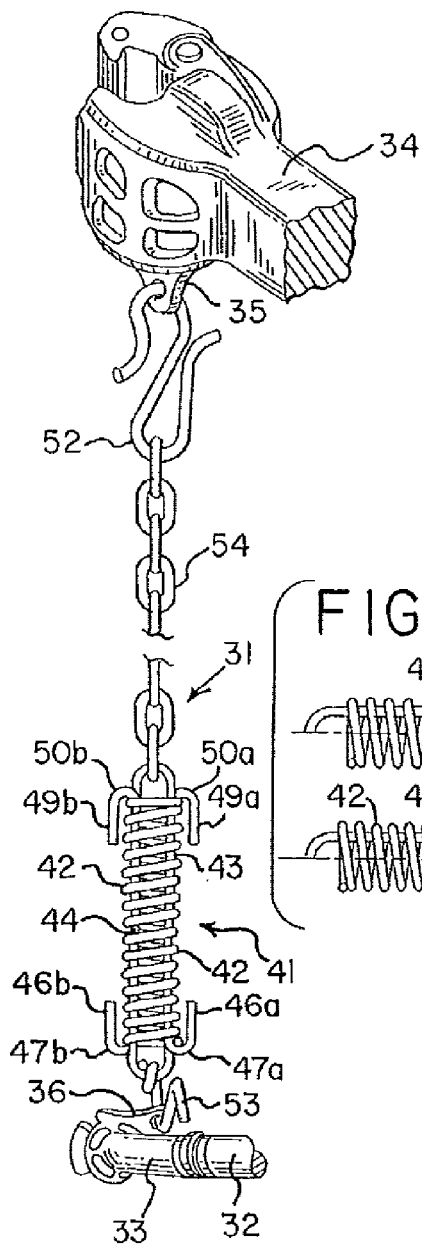
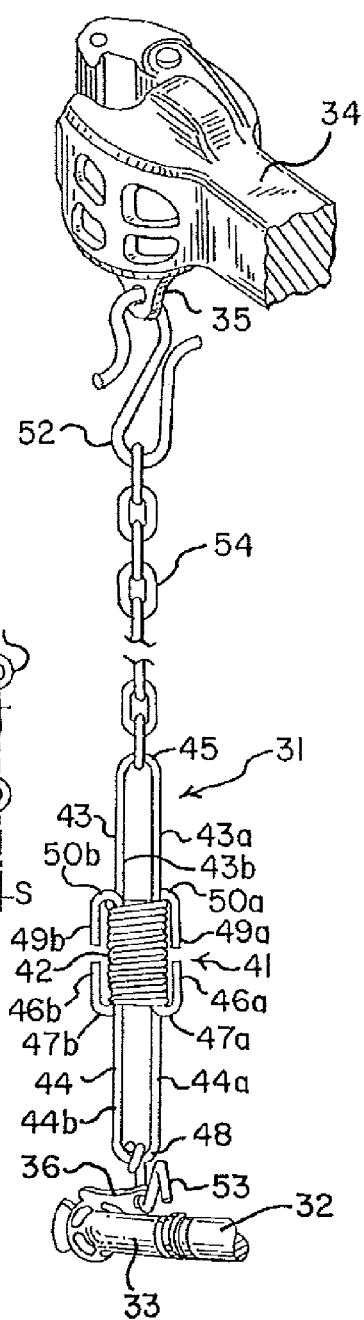

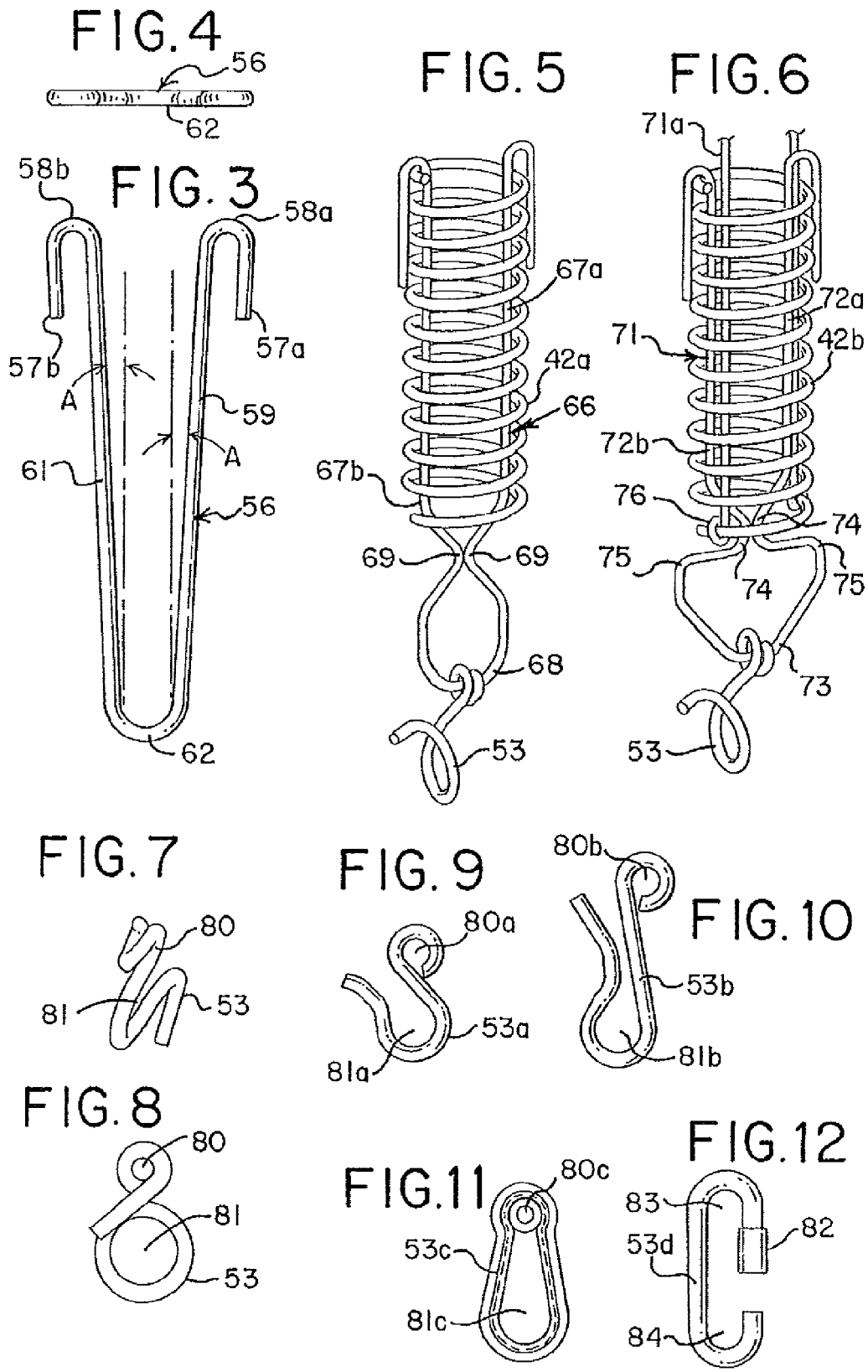

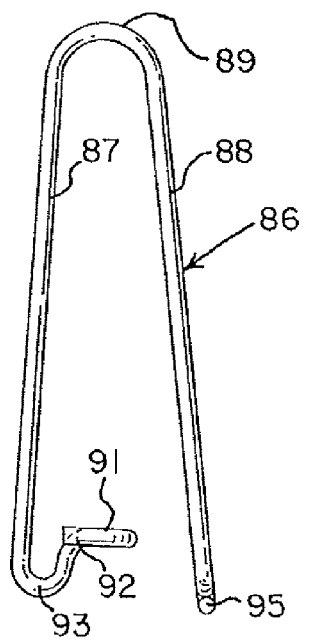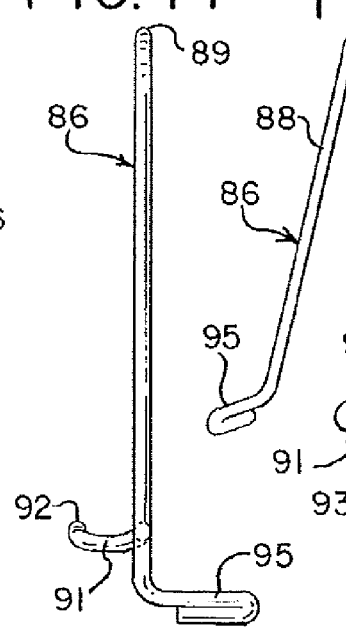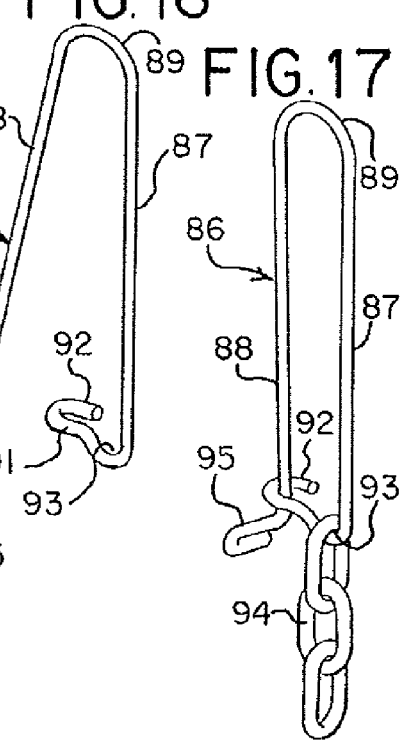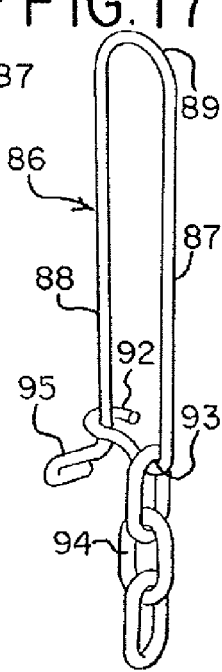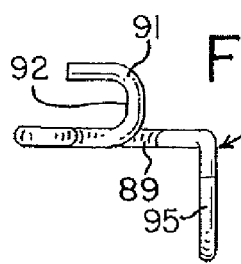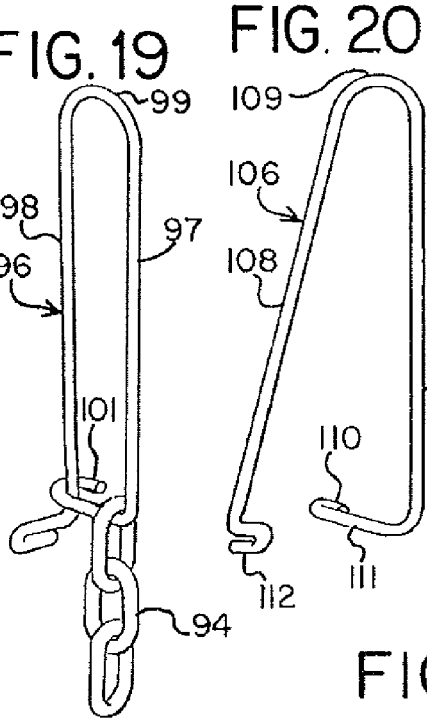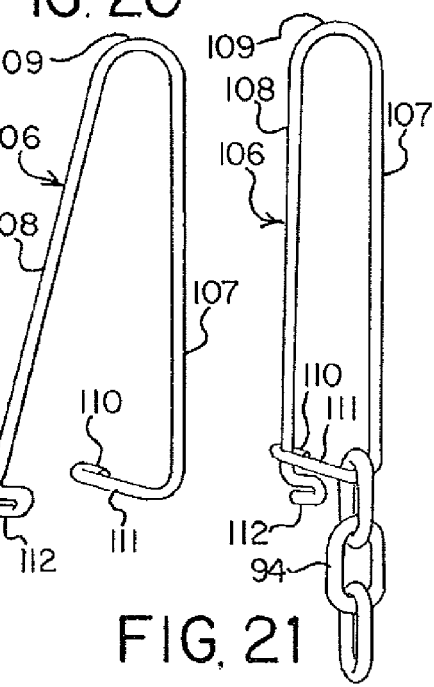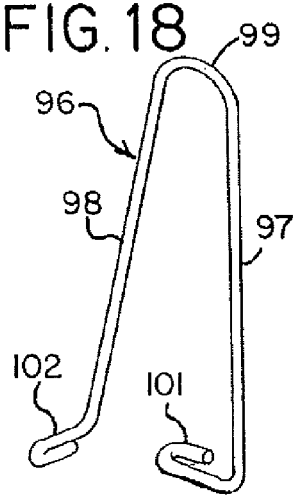

SPRING-STYLE AIR BRAKE HOSE SUPPORT

BACKGROUND

1. Field of the Disclosure

The present subject matter relates to supports for railway hoses, and particularly to support assemblies that are of a spring style and provide both stretch and energy absorption during use in suspending and supporting railway brake air hoses, typically from a hose glad hand to a railway coupler.

2. Description of Related Art

Suspension devices for air brake hoses of railway cars are known for suspending from railway car couplers. Such suspension devices help to safely maintain a hose in place during use and transport while allowing for limited movement of the air brake hose in order to facilitate connection of the air brake hose to the remainder of the air brake mechanism and line while permitting the air brake hose to move as needed in order to avoid undesired uncoupling while still restricting movement of the hose to an extent that uncoupling is accomplished only when desired. A typical function of such devices is to provide a secondary or safety support mechanism for the air brake hose.

Typically, hose support systems are provided on each end of a railway car to support the brake air hose above the rails while being connected to a coupler and to an end of the railway unit. Examples of prior hose support systems are found in U.S. Pat. No. 6,422,521, some such supports including a flat (often fabric or polymeric) strap with a connector positioned in a railway car aperture and a different connector at the other end positioned in an aperture of the brake hose. This includes an adjustably positioned clasp which receives the tongue that adjustably extends through the clasp. This particular patent teaches the strap to be cloth of a substantially non-extensible material. By another approach, a hose strap for a railway car brake line is disclosed in U.S. Pat. No. 8,201,779. This hose strap is polymeric or rubber and is flexible and has a plurality of oblong through-holes. Metal clips attach to opposite ends of the strap and pass through the strap holes for connection of the hose support strap to the coupler head and to the glad hand of the brake hose. Another suspension strap for a railway brake air hose that utilizes clips for attachment in a similar manner is U.S. Pat. No. 8,276,853. The subject matter of the publications and patents referenced above and elsewhere herein are hereby incorporated by reference hereinto.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

As with other railway air brake hose supports, the present supports are provided to maintain a proper height above the rails and railroad ties and ballast while avoiding excessive railway hose movement that could lead to inadvertent separation of railway hose couplings and/or unintended sudden release of pressurized air along the railway train components. It will be appreciated that uncoupling by air brake hoses along a railway train while in transport mode typically will cause emergency braking and perhaps excessively abrupt stopping of the train cars involved, which can lead to inconvenience and possible safety concerns. Damage to equipment and even derailment can be included in these concerns.

In achieving these types of functions of air brake hose supports, the present disclosure seeks to address an objective of having a very durable support assembly that still affords a reasonable degree of flexibility that is well controlled both during use as a hose assembly and upon disconnection of the hose coupling condition that is otherwise maintained during running of the train.

In one aspect of this disclosure, the air brake hose support of the present disclosure is fully metallic; that is, each component of the assembly is constructed of a durable metal. In addition, the air brake hose support is responsive to loads being applied to the assembly to the extent that the total length of the assembly increases under load while returning to its pre-loaded length, or within allowable limits of its pre-loaded length when the load is reduced or removed. A compressible spring defining an elongated passageway has received therewithin at least one spring wireform which contributes to action that compresses the compressible spring, resulting in elongation of the length of the support assembly.

In another aspect of this disclosure, a railway air brake hose support is provided to include a longitudinally compressible coil spring. A first spring wireform is positioned at least partially within the compressible spring and has at least two legs that engage one end portion of the longitudinally compressible spring, with the other end of the spring wireform being within or projecting beyond the other end of the compressible coil spring. A second internal spring wireform is similarly positioned with respect to the compressible coil spring, except its legs engage the other end portion of the compressible spring while being within or protruding from the end of the compressible spring at which the first internal spring wireform is engaged. The first such other end of the first internal spring wireform is attached, directly or indirectly, to a coupler of the railway car, while the second such other end is attached, directly or indirectly, to the air brake hose, typically at its glad hand location. When forces are encountered along the assembly, the wireforms are able to move in opposite directions in opposition to the bias of the longitudinally compressible spring, allowing for length extension of the support assembly and substantially full reversal on that extension upon removal or dissipation of such force.

In a further aspect of this disclosure, a railway hose support assembly is provided with a retraction-biased extension unit having a longitudinally compressible spring having a first end, a second end, and an inside surface, as well as a first internal spring wireform positioned within the compressible spring inside surface having at least two legs meeting at a closed end, each leg having a free end spaced away from the closed end, each free end securely engaging the longitudinally compressible spring first end, together with a second internal spring wireform positioned within the compressible spring inside surface having at least two legs meeting at a closed end, each leg having a free end spaced away from the closed end, each free end securely engaging the longitudinally compressible spring second end. The closed end of each of the first and second internal spring wireforms is accessible externally of the longitudinally compressible spring, whereby movement of the respective closed ends in opposite directions compresses the longitudinally compressible spring when a load is applied between a railway brake hose and a railway coupler.

In a further aspect of this disclosure, a railway hose support assembly is provided with a retraction-biased extension unit having a longitudinally compressible spring having a first end, a second end, and an inside surface, as well as a first internal spring wireform positioned within the compressible spring inside surface having at least two legs meeting at a closed end, each leg having a free end spaced away from the closed end, each free end securely engaging the longitudinally compressible spring first end, together with a second internal spring wireform positioned within the compressible spring inside surface having at least two legs meeting at a closed end, each leg having a free end spaced away from the closed end, each free end securely engaging the longitudinally compressible spring second end. The closed end of each of the first and second internal spring wireforms is accessible externally of the longitudinally compressible spring, whereby movement of the respective closed ends in opposite directions compresses the longitudinally compressible spring when a load is applied between a railway brake hose and a railway coupler. The closed ends of the respective internal spring wireforms are adapted to securely engage with a railway brake hose glad hand aperture and a railway coupler aperture.

In a further aspect of this disclosure, a railway hose support assembly is provided with a retraction-biased extension unit having a longitudinally compressible spring having a first end, a second end, and an inside surface, as well as a first internal wireform positioned within the compressible spring inside surface having at least two legs meeting at a closed end, each leg having a free end spaced away from the closed end, each free end securely engaging the longitudinally compressible spring first end, together with a second internal wireform positioned within the compressible spring inside surface having at least two legs meeting at a closed end, each leg having a free end spaced away from the closed end, each free end securely engaging the longitudinally compressible spring second end. The closed end of each of the first and second internal wireforms is accessible externally of the longitudinally compressible spring, whereby movement of the respective closed ends in opposite directions compresses the longitudinally compressible spring when a load is applied between a railway brake hose and a railway coupler. The closed ends of the respective internal wireforms are adapted to securely engage with a railway brake hose glad hand aperture and a railway coupler aperture by way of a coupler link between the railway coupler aperture and the closed end of the first internal wireform and a hanger fink between the hose glad hand aperture and the second internal wireform.

In an added aspect of this disclosure, a railway air brake hose support is provided to include a longitudinally compressible coil spring. A first spring wireform is positioned within the compressible spring and has at least two legs that engage one end portion of the longitudinally compressible spring, with the other end of the spring wireform projecting beyond the other end of the compressible coil spring. A second internal spring wireform is similarly positioned with respect to the compressible coil spring, except its legs engage the other end portion of the compressible spring while protruding from the end of the compressible spring at which the first internal spring wireform is engaged. The end of the first internal spring wireform that projects beyond the compressible coil spring is attached, directly or indirectly, to a coupler of the railway car, while the portion of the second internal spring wireform that extends beyond the compressible coil spring is attached, directly or indirectly, to the air brake hose, typically at its glad hand location. When forces are encountered along the assembly, the wireforms are able to move in opposite directions in opposition to the bias of the longitudinally compressible spring, allowing for length extension of the support assembly and substantially full reversal on that extension upon removal or dissipation of such force such that the unit exhibits a spring set of not greater than 0.5 inch.

In a further aspect of this disclosure, a railway hose support assembly is provided with a retraction-biased extension unit having a longitudinally compressible spring having a first end, a second end, and an inside surface, as well as a first internal spring wireform positioned within the compressible spring inside surface having at least two legs meeting at a closed end to define a biased outwardly angle of at least one of the legs of at least 0.5 angular degree to enhance damping, each leg having a free end spaced away from the closed end, each free end securely engaging the longitudinally compressible spring first end, together with a second internal spring wireform positioned within the compressible spring inside surface having at least two legs meeting at a closed end, each leg having a free end spaced away from the closed end, each free end securely engaging the longitudinally compressible spring second end. The closed end of each of the first and second internal spring wireforms is accessible externally of the longitudinally compressible spring, whereby movement of the respective closed ends in opposite directions compresses the longitudinally compressible spring when a load is applied between a railway brake hose and a railway coupler. The closed ends of the respective internal spring wireforms are adapted to securely engage with a railway brake hose glad hand aperture and a railway coupler aperture.

In yet another aspect of this disclosure, a railway hose support assembly is provided with a retraction-biased extension unit having a longitudinally compressible spring having a first end, a second end, and an inside surface, as well as a first internal spring wireform positioned within the compressible spring inside surface having at least two legs meeting at a closed end, each leg having a free end spaced away from the closed end, each free end securely engaging the longitudinally compressible spring first end, together with a second internal spring wireform positioned within the compressible spring inside surface having at least two legs meeting at a closed end, each leg having a free end spaced away from the closed end, each free end securely engaging the longitudinally compressible spring second end. The closed end of each of the first and second internal spring wireforms is accessible externally of the longitudinally compressible spring, whereby movement of the respective closed ends in opposite directions compresses the longitudinally compressible spring when a load is applied between a railway brake hose and a railway coupler. The closed ends of the respective internal spring wireforms are adapted to securely engage with a railway brake hose glad hand aperture and a railway coupler aperture through at least one adjustable spacer that connects with a closed end of one of the internal spring wireforms.

BRIEF DESCRIPTION OF THE DRAWINGS

FIG. 1 is perspective view of a railway air brake hose support positioned between and connected to a railway coupler and a brake hose glad hand, including a compressible coil spring in an extended or pre-compressed condition;

FIG. 2 is perspective view of a railway air brake hose support positioned between and connected to a railway coupler and a brake hose glad hand, including a compressible coil spring in a compressed condition;

FIG. 2A is schematic view illustrating the spring set "S" of the coil spring after release from a fully compressed state FIG. 3 is an elevation view of a spring version of an internal wireform component of a support assembly according to an embodiment;

FIG. 4 is a top plan view of the internal spring wireform illustrated in FIG. 3;

FIG. 5 is a perspective view of an alternate embodiment of an internal wireform, shown positioned within a coil spring and having an attachment member secured thereto;

FIG. 6 is a perspective view of a further alternate embodiment of an internal wireform, shown positioned within a coil spring and having an attachment member secured thereto;

FIG. 7 is a perspective view of a "pigtail" style of attachment component of an embodiment of a railway hose support assembly;

FIG. 8 is an elevation view of the attachment of FIG. 7;

FIG. 9 is an elevation view of an alternate attachment component of a railway hose support unit;

FIG. 10 is an elevation view of an alternate attachment component of a railway hose support unit;

FIG. 11 is an elevation view of yet another embodiment of an alternate attachment component of a railway hose support unit;

FIG. 12 is an elevation view of an alternate attachment component of a railway hose support unit;

FIG. 13 is a front elevation view of a wireform clip as an attachment component option in an embodiment of the assembly;

FIG. 14 is a side elevation view of the clip of FIG. 13;

FIG. 15 is a plan view of the clip of FIG. 13;

FIG. 16 is a perspective view of the clip of FIG. 13, shown in an open orientation;

FIG. 17 is a perspective view of the wireform clip illustrated in FIG. 13, in a closed orientation and with a chain member depending therefrom;

FIG. 18 is a perspective view of an added embodiment of a wireform clip attachment component, shown in an open orientation, for an embodiment of a support assembly;

FIG. 19 is a perspective view of the wireform clip illustrated in FIG. 18, in a closed orientation and with a chain member depending therefrom;

FIG. 20 is a perspective view of another embodiment of a wireform clip, shown in an open orientation, for an embodiment of a support assembly;

FIG. 21 is a perspective view of the wireform clip illustrated in FIG. 20, in a closed orientation and with a chain member depending therefrom;

DESCRIPTION OF THE ILLUSTRATED EMBODIMENTS

Figure 22:
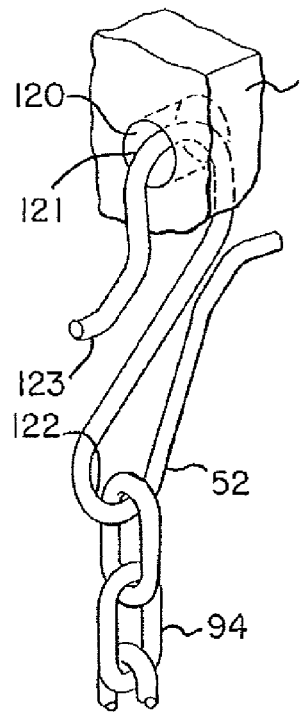
FIG. 22 is a perspective view of an attachment clip embodiment shown suspended through an aperture of a railway car coupler and showing a chain component, partially broken away, depending therefrom, same being a component of an embodiment of an air brake hose support.

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

FIG. 1 and FIG. 2 illustrate an embodiment of a railway hose support, generally designated at 31, which includes a plurality of components connected to and engaged with each other. Support assembly 31 is illustrated in its in-use condition by which a railway hose 32, such as an air brake hose or steam hose, is suspended at its glad hand end 33 from a railway coupler 34. More particularly, one of the components of the support assembly is inserted through an orifice of a coupler bracket 35. The other end of the support assembly is inserted through an opening of a hanger bracket 36 of the railway hose 32.

With more particular reference to the railway hose support assembly 31 that is illustrated in this embodiment, same includes multiple components as follows. A retraction-biased extension unit 41 is included that allows extension of the railway hose support assembly 31 in a manner of increasing bias toward contraction for returning to or substantially to its non-extended length in absence of a load. The non-extended length of the retraction-biased extension unit 41 is illustrated in FIG. 1, while the extended condition thereof is illustrated in FIG. 2. In the illustrated embodiments, unit 41 is secured to the coupler bracket 35 and the hanger bracket 36 by attachment components of various configurations including those embodiments illustrated herein.

With more particular reference to the retraction-biased extension unit 41, this includes a longitudinally compressible spring 42 and a structure that compresses the spring in response to forces that increase the length of the extension unit 41. In the illustrated embodiments, at least two internal wireforms are included in the extension unit 41. Each internal wireform has free ends that engage the longitudinally compressible spring 42 and a closed end by which the extension unit is attached to other members so as to receive forces as described herein. As discussed herein, the internal wireforms can be imparted with spring properties for adding functions such as damping in response to sudden load removal or other sudden events.

In the illustrated embodiment of FIG. 1 and FIG. 2, a first internal wireform 43 and a second internal wireform 44 are included in the retraction-biased extension unit 41. First internal wireform 43 has a pair of legs 43a, 43b joined at a closed end 45 and terminating at free ends 46a, 46b. Leg bends 47a, 47b are relatively closely spaced from the free ends 46a, 46b, respectively, in order to engage an end portion of the longitudinally compressible spring 42.

Second internal wireform 44 likewise has a pair of legs 44a, 44b, a closed end 48, free ends 49a, 49b, and leg bends 50a and 50b. While both the first internal wireform and the second internal wireform are positioned with their respective legs within the longitudinally compressible spring 42, these internal wireforms are generally oppositely oriented such that the leg bends of the first internal wireform engage one end portion of the longitudinally compressible spring while the leg bends of the second internal wireform engage the opposite end portion of the longitudinally compressible spring. Likewise, the respective closed ends 45, 48 are oriented in opposite directions with respect to the longitudinally compressible spring 42. As opposing forces are directed on the extension unit 41, such as when a load is applied, the spacing between the closed end 45 and the closed end 48 increases. When the forces or load are lessened or removed, resiliency of the longitudinally compressible spring 42 reduces the distance between closed end 45 and closed end 48 until a less-compressed or uncompressed state is achieved such as illustrated in FIG. 1.

The retraction-biased extension unit 41 illustrated in FIG. 1 and FIG. 2 further includes a coupler link 52 to directly or indirectly grasp closed end 45 in order to provide the needed connection between the retraction-biased extension unit 41 and the coupler bracket 35. This illustrated embodiment also includes a hanger link 53 that directly or indirectly engages the closed end 48 of the retraction-biased extension unit 41, by virtue of which the railway hose, such as its glad hand end 33, is secured to the railway hose support assembly 31. In this particular embodiment, the engagement between coupler link 52 and retraction-biased extension unit 41 is indirect in that a spacer 54 such as the illustrated link chain is provided.

A particular embodiment of an internal wireform is illustrated in FIG. 3 and FIG. 4, generally designated at 56. This embodiment provides an internal spring wireform having free ends 57a, 57b and associated leg bends 58a, 58b opening into legs 59, 61 joined together at closed end 62. When desired, this embodiment can be included in the retraction-biased extension unit 41 of the embodiment of FIG. 1. It will be noted that, as depicted in FIG. 3, this internal spring wireform 56 is shown in an open condition. A closed condition of internal spring wireform 56 would be one at which the legs 59, 61 are closer together near the free end than shown in FIG. 3, along the lines of the spacing between legs 43a, 43b in the embodiment of FIG. 1 and FIG. 2. Internal spring wireform 56 is made of a metal with resiliency properties, and it will be appreciated that movement of the internal spring wireform 56 from the opened condition of FIG. 3 to a closed condition on the order of that illustrated in FIG. 1, internal spring wireform legs 59, 61 will be biased in the outwardly directed orientation, such bias being directed against the inner surface of the longitudinally compressible spring 42 which contributes to stretch and energy absorption as discussed elsewhere herein.

With particular reference to the respective orientation of legs 59, 61 in the open configuration of internal spring wireform 56, the legs are non-parallel with respect to each other and exhibit an opening angle "A" (FIG. 3) with respect to the longitudinal axis of the internal spring wireform 56. When in the closed configuration, the opening angle "A" is approximately 0° or slightly greater, as a result of which all or a portion of the legs 59, 61 exert a force onto the inside surface of the longitudinally compressible spring 42. In the open orientation, angle "A" typically will not exceed 25° with respect to the longitudinal axis.

When in the open configuration as illustrated in FIG. 3, the opening angle "A" is at least 0.5°. Depending upon the particular configuration of the retraction-biased extension unit and of the length and resiliency of the internal spring wireform, the opening angle "A" can be between about 0.5 and 25°, between about 1 and 20°, between about 1 and 15°, or between about 1 and 10°. Many embodiments will exhibit an opening angle "A" of between about 2 and about 8°, between about 1.5 and about 6°, between about 2 and about 5°, or between about 2 and 4°. When the internal wireform is not necessarily of a spring type, the angle "A" can be 0° or even slightly negative by having the legs inwardly angled.

The assembly of FIG. 5 includes a longitudinally compressible spring 42a and an internal wireform generally designated at 66. A second, oppositely oriented internal wireform can be included in this FIG. 5 embodiment, although not shown. Such could take the form of an internal spring wireform 56 positioned within longitudinally compressible spring 42a such that its closed end 62 extends out of spring 42a at its end opposite from which the closed end of internal wireform 66 extends.

Internal wireform 66 includes bends between both of its legs 67a, 67b and its closed end 68. More specifically, a retainer loop 69 is formed at these locations. The illustrated retainer loops are formed in opposing directions and engage or are closely spaced from each other at their respective maximum inwardly bent locations. These retainer loops 69 are provided to prevent movement of adjoining components along the legs of the internal wireform. In the case of the internal wireform that connects directly or indirectly to the glad hand end 33, the retainer loops 69 help to contain the bottom portion of the unit, for example the hanger link 53 in FIG. 5, from sliding up along the internal wireform legs 67a, 67b, potentially resulting in temporary unintended component interaction or interference with one another and/or shortening of the total length of the railway hose support assembly. Whether or not directly shown in FIG. 5, a second, oppositely oriented internal wireform 66 can be included with its closed end in the upward direction, with retainer loops therebelow, in order to prevent an item thereabove, such as the adjustable spacer 54 in FIG. 1, from sliding down along the legs of this second internal wireform and possibly entering into and interfering with operation of the longitudinally compressible spring 42a.

FIG. 6 depicts an internal wireform 71 within the longitudinally compressible spring 42b. Wireform 71 has legs 72a, 72b, a closed end 73 and a pair of oppositely directed retainer loops 74 that function generally in accordance with retainer loops 69 of the FIG. 5 embodiment. The FIG. 6 embodiment adds formation of stops 75 adjacent the retainer loops 74 in the direction of the closed end 73. Stops 75 act to prevent the internal wireform 71 from projecting out of the longitudinally compressible spring 42b, such as when the railway hose support assembly experiences a sudden load release. In this regard, it will be appreciated that the stops 75 have a combined horizontal segment width that is greater than the external diameter of the longitudinally compressible spring 42b.

FIG. 6 includes a second internal wireform 71a, shown partially cut away. This illustrates the feature of having its free ends 76 bent to a greater degree than free ends 49a, 49b of FIG. 1. In the embodiment illustrated in FIG. 6, free ends 76 are formed into a tight loop around a turn of the longitudinally compressible spring 42b. Such closed free ends 76 assist in preventing the projection or propulsion for which stops 75 are intended, while also reducing the likelihood that open free ends such as 49a, 49b of FIG. 1 will deform outwardly if subjected to extreme force during use, which force would be applied along the legs in the direction from the free ends to the closed end of the internal wireform.

FIG. 7 and FIG. 8 provide further detail of the hanger link 53 shown in FIGS. 1, 2, 5 and 6. Essentially this has two loops, a smaller loop 80 and a larger loop 81. Typically, the smaller loop connects with, such as being threaded over, the downwardly directed internal wireform, while the larger loop 81 connects with, such as being threaded through, the aperture through the glad hand end 33. Accordingly, the hanger link 53 connects the railway hose support assembly with the railway hose 32.

While the hanger link 53 can be considered as a "pig tail" shape, other hanger links can provide a more linear arrangement of the loops. For example, FIG. 9 shows a spacer link 53a having a smaller loop 80a and a larger loop 81a along substantially along the same plane, while hanger link 53b of FIG. 10 is a smaller loop 80b and a larger loop 81b along the same plane. Hanger link 53c of FIG. 11 takes on the configuration of a carabiner having a smaller loop 80c that can include a rotatable component as generally known in the art, along with a larger loop 81c. Hanger link 53d of FIG. 12 has a threaded lock member 82 closing off loops 83, 84 after the internal wireform closed end and the glad hand aperture have been threaded through with the hanger link 53d.

Coupler link 52 that is shown in FIG. 1 and FIG. 2, and which is shown in greater detail in FIG. 22, is an example of a coupler attachment link. Other options or alternative embodiments in this regard are shown in FIGS. 13-21, FIG. 23 and FIG. 24.

One of the illustrated embodiments is coupler link 86 of FIG. 13 through FIG. 17. Its open orientation is depicted in FIG. 13 and FIG. 16, same generally operating similar to a safety pin, the closed orientation being shown in FIG. 17. A generally stationary prong 87 is joined to pivotable prong 88 along a generally U-shaped bend 89. Prong 87 has an end segment 91 projecting from prong 87 at an approximate right angle such that its hook end 92 is directed toward the stationary prong 87 in order to engage same and close the coupler link 86. Additionally, the end segment 91 includes an outwardly oriented downwardly depending saddle 93. In this illustrated embodiment, saddle 93 is immediately adjacent the stationary prong 87 to allow a component such as an adjuster chain 94 to rest within saddle 93 at a position close to the vertical or generally stationary prong 87, with the result that the prong 87 is subjected to substantially vertical forces thereby providing a more axial pull action from the adjustable chain or the like with respect to the vertical or generally stationary prong 87. Stress reduction is an objective on this structure. Pivotable prong 88 includes an end segment 95 at its free end that projects out of the plane defined by the links 86 and 87, for example at a right angle with respect to such plane, thereby providing a handle member by which the pivotable prong 88 can be easily grasped during opening and closing of the coupler link 86. Strength enhancement of this handle member 95 can be achieved by bending the end segment on itself as shown, for example, in FIG. 14.

In use, one of the end segments of the coupler link 86 is fed into aperture of the railway coupler, another component of the railway hose support assembly (such as a chain or other adjustment component) is nested into the saddle 93, the handle 95 is grasped and force is applied such that the pivotable prong 88 moves into the hook end 92 and is released in order to close the coupler link 86, thereby joining the railway hose support assembly or a component thereof from the railway coupler.

Another embodiment of a coupler attachment member is coupler link, generally designated at 96 in FIG. 18 and FIG. 19. This also is of a safety-pin style having a generally stationary prong 97 and a pivotable prong 98 joined in a U-shaped bend 99. A hook end 101 is at the free end of prong 97, and a graspable end segment 102 projects outwardly from the pivotable prong 98. In use, one of the free ends of the coupler link 97 is passed through an aperture of a railway coupler and a member such as chain 94 or other adjustment member can be added and suspended from the coupler link 96 when the pivotable prong 98 is fed into the hook end 101 to close the coupler link.

A further embodiment of a coupler attachment member is generally designated at 106 in FIG. 20 and FIG. 21. This also operates in the nature of a safety pin, having a generally stationary prong 107, a pivotable prong 108, a U-shaped bend 109 and a grasping handle 112 projecting out of the plane defined by prongs 107 and 108. End segment 111 of this embodiment extends toward the pivotable prong 108 such that the end segment 111 defines an acute angle with respect to the pivotable prong 107. In use, after the coupler link 106 is fed through an aperture of a railway coupler, the link is suspended at its U-shaped bend, chain 94 or other component is positioned on the end segment 111, and the handle 112 is grasped to move the pivotable prong 108 into hook 110 at the end of the end segment 111 to thereby attach the railway hose support assembly or a component thereof.

As noted previously, FIG. 22 depicts in greater detail the coupler link 52 of FIG. 1. A portion of railway coupler 34 can be seen in FIG. 22, its aperture 120 receiving the coupler link 52, which is generally S-shaped with an upper hook portion 121 and a lower hook portion 122 for receiving an adjoining component of the railway hose support assembly, such as adjuster chain 94. Upper hook 121 includes a widened lead-in 123 to facilitate entry into the coupler aperture 120. Typical installation has the chain 94 or the like suspended from the lower hook 122 while the lead-in 123 enters the coupler aperture 120 for passage of the upper hook 121 thereinto. Adjustment of the length of the railway hose support assembly can include removing a chain link from the lower hook 122 and inserting a different chain link to either shorten or lengthen the support assembly. Alternatively, in some instances, there is no need to first remove a link from the lower hook 122 before inserting another link into the hook 122.

Figure 23:
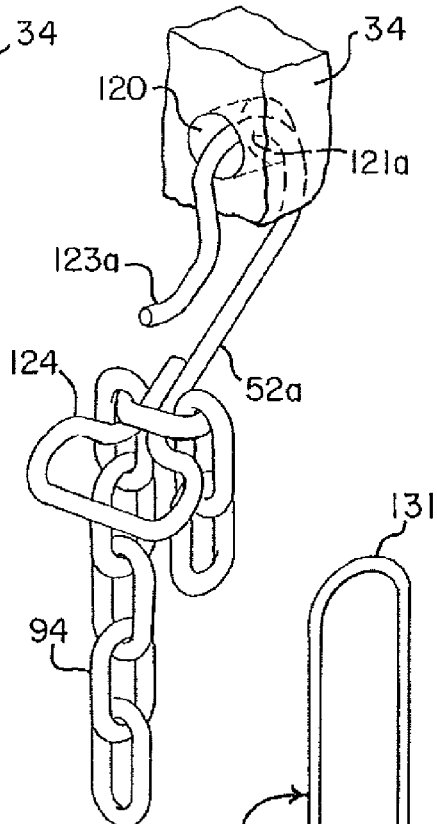
FIG. 23 is a perspective view of another embodiment of an attachment clip shown suspended through an aperture of a railway car coupler and showing a chain component, partially broken away, depending therefrom, same being a component of an embodiment of an air brake hose support.

Coupler link 52a of FIG. 23 has a similar upper hook 121a and widened lead-in 123a as in FIG. 22. The lower portion has a widened area or stop 124. Installation according to this embodiment has a link or links of the chain 94 or the like inserted through the upper hook 121a, which is then slid down until engagement with the stop 124. Thereafter, the upper hook 121a is fed into and through the coupler aperture 120. Adjustment is accomplished by reversing these steps and inserting a different chain link or the like into engagement with the stop 124, followed by reinsertion into the coupler aperture 120.

Figure 24:
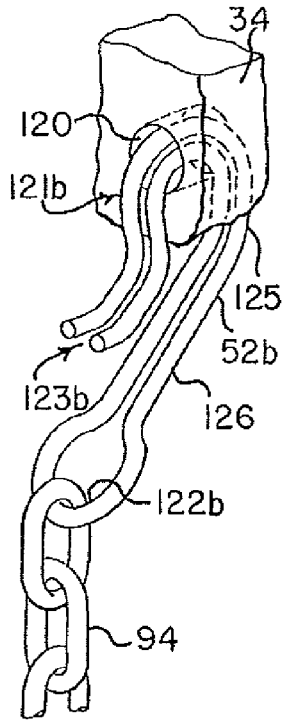
FIG. 24 is a perspective view of yet a further embodiment of an attachment clip shown suspended through an aperture of a railway car coupler and showing a chain component, partially broken away, depending therefrom, same being a component of an embodiment of an air brake hose support.

FIG. 24 illustrates coupler link 52b having an upper hook generally designated at 121b and a lower hook 122b. This is a dual member link having a first leg 125 and a second leg 126 that are generally parallel to each other along at least the upper hook 121b, terminating in a dual widened lead-in 123b. For installation, the support assembly member below same, such as a link of adjuster chain 94, is slid between the first leg 125 and second leg 126, beginning at the widened lead-in 123b until the lower hook 122b is reached. At this stage, the upper hook 121b is fed through coupler aperture 120. When length adjustment is desired, clip 52b is removed from the coupler aperture 120. The adjustment length such as chain 94 is removed between the first and second legs, and a different portion of the adjuster, such as a different link of chain 94, is slid between the legs, and the coupler link 52b is reinserted through the coupler aperture 120.

Figure 25:
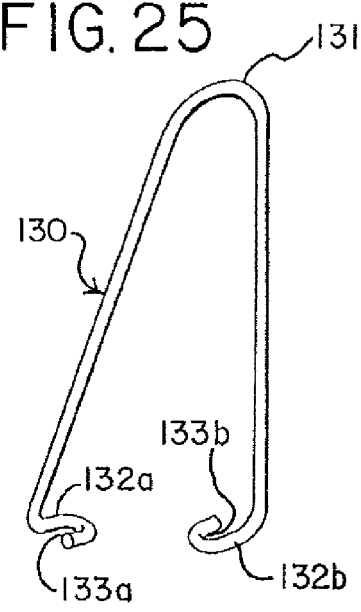
FIG. 25 is a perspective view of an embodiment of a wireform clip, in open condition, useful in an embodiment of the air brake hose support assembly that includes an adjustment mechanism.
Figure 26:
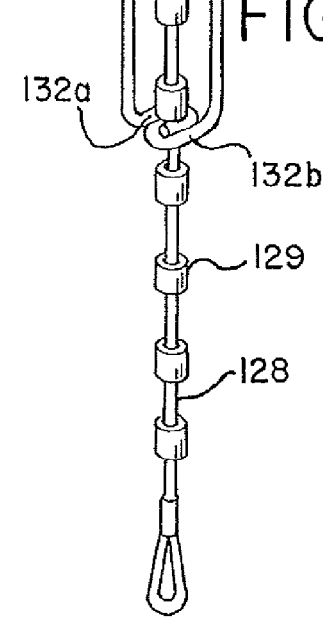
FIG. 26 is a perspective view of the wireform clip shown in FIG. 25, in closed condition at which the clip grasps a cable with stops to provide length adjustment capability to the support assembly.

An embodiment of a different adjustment mechanism is illustrated in FIG. 25 and FIG. 26. A cable 128 with a plurality of stops 129 is combined with a coupler attachment wireform 130, shown in an open condition in FIG. 25. Wireform 130 has a pair of legs joined at a closed end 131 and terminating in a pair of inwardly directed arms 132a, 132b. Each arm has a hook at its terminus. The hooks are oppositely directed and are brought into axial alignment with each other when the legs converge. In this illustrated embodiment, hook 133a axially aligns with hook 133b when the wireform 130 is in its closed orientation as illustrated in FIG. 26. With this embodiment, one of the arms and its leg are fed through coupler aperture 120 until the closed end 131 rests in the aperture. Thereafter, the cable 128 is slid into one of the hooks, for example hook 133b. Then, the other leg and arm are moved toward the cable until the other hook, for example hook 133a, encircles the cable. The location of cable insertion is selected so the arms 132a, 132b are below the stop 129 to which adjustment is desired. Readjustment essentially reverses the process while the operator selects a different stop besides 129.

Figure 27:
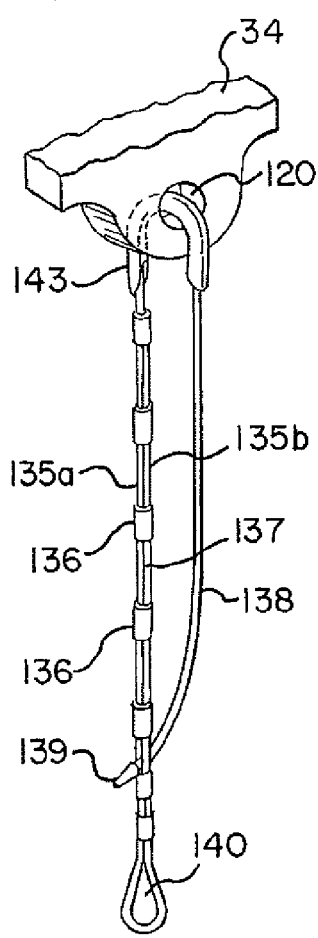
FIG. 27 is a perspective view of an embodiment of an adjustment mechanism component of a further embodiment of a railway air brake hose support assembly.

Another type of adjustment mechanism for attachment through the coupler aperture 120 is shown in FIG. 27. Typically same replaces a coupler link and chain arrangement of the other embodiments with a cable assembly including side-by-side cables 135a, 135b having a plurality of retainers 136 to define a plurality of eyes 137 defined by the two cables and the two retainers. One of the cables is an extending cable 138 that extends beyond the retainers and is adapted to pass through and be retained by a selected eye 137. This function can be facilitated by a bullet 139 having a stop surface that engages the cable lengths within the eye. This type of structure is described more fully in U.S. Pat. No. 4,519,564. Joining with the remainder of the railway hose support assembly is facilitated by inclusion of a loop 140.

Figure 28:
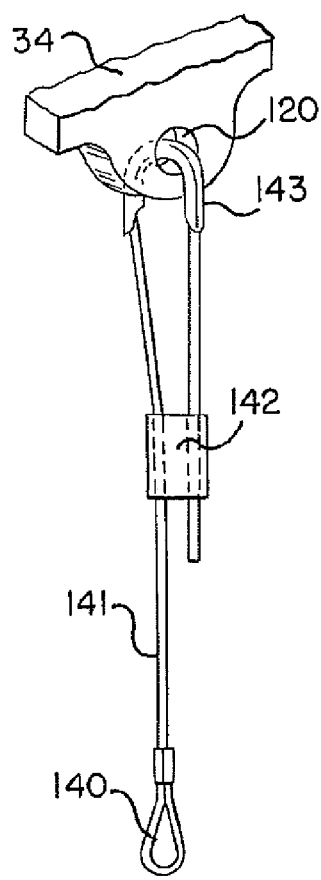
FIG. 28 is a perspective view of an alternate adjustment mechanism for providing adjustment capabilities to an embodiment of a railway air brake hose support assembly.

FIG. 28 illustrates another embodiment having a cable 141 with loop 140 at one end and a locking mechanism 142, such as a Kwik-Loc™ cable lock that allows adjustment of the length between the coupler aperture 120 and the loop 140 by increasing or decreasing the amount of cable free end projecting out of the locking mechanism 142. When desired, a guard 143 can be included for extending the life of the cable of the FIG. 27 and FIG. 28 embodiments.

Figure 29:
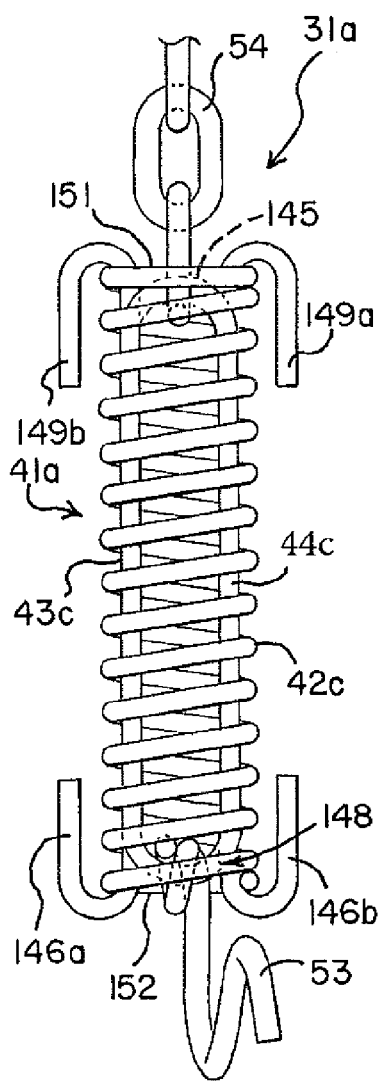
FIG. 29 is an elevation view of an alternate embodiment of a spring-style railway hose support, partially broken away.

FIG. 29 illustrates a further embodiment of the railway hose support assembly, generally designated at 31a in this view, and particularly of its retraction-biased extension unit 41a. A longitudinally compressible spring 42c is shown, along with oppositely oriented internal wireforms 43c and 44c. First internal wireform 43c has a closed end 145 which, prior to compression of the longitudinally compressible spring, is within or at least flush with one end 151 of the spring. The free ends 146a and 146b of the first internal wireform 43c engage the other end 152 of the spring. Second internal wireform 44c has a closed end 148 which, prior to compression of the longitudinally compressible spring, is within or at least flush with the other end 152 of the spring. The free ends 149a and 149b of the second internal wireform 44c engage the other end 151 of the spring. With this embodiment, the closed end 145 is accessible to a connector such as illustrated chain 54 before the closed end 145 extends outside of the longitudinally compressible spring, and the closed end 148 is accessible to a connector such as hanger link 53 before the closed end 148 extends outside of the longitudinally compressible spring.

With particular reference to the retraction-biased extension unit, such as that illustrated at 41 in FIG. 1 and FIG. 2, as well as its components as illustrated in FIG. 3 through FIG. 6, same is an all-metal assembly that allows for its lengthening by compression of the longitudinally compressible spring. Such lengthening typically occurs when rail cars are uncoupled while the air brake system still is pressurized. At such times, there is a violent reaction that occurs when the glad hands are pulled apart during this process. With the present structures, the spring compresses during this action in order to absorb some of that energy. Another instance during which lengthening of the assembly is advantageous occurs when the distance between the coupler aperture and the glad hand aperture exceeds the length of a rigid air brake hose support. This condition can develop on rail cars having large lateral angular swings and large longitudinal movements that can be addressed by an air brake hose support having the ability to stretch.

With the present disclosure, it is possible to provide adequate stretch length and thus energy absorption and with enhanced control. Control can include damping of the longitudinally compressible spring, primarily by interaction with the internal wireforms that have the spring characteristics discussed herein. As previously noted, the legs of such internal spring wireforms can be biased outwardly to provide a damping force against the inside surface of the longitudinally compressible spring while helping to absorb some of the energy when the spring moves from a compressed state (such as after an uncoupling event) to a free or uncompressed state. The amount of damping force is affected by multiple variables, as now discussed.

These variables affect the damping action generated by the interaction between the longitudinally compressible spring and the internal spring wireforms of the retraction-biased extension unit having internal spring wireforms. Such retraction-biased extension units maintain the spring set mandated by the American Association of Railroads ("AAR") Standard S-4006. The permanent set test of the S-4006 standard include applying a standard load on the railway hose support assembly to sustain the applied load without stretching more than 1.0 inch during a 120-hour period after gradual load removal and a wait time of not greater than two hours. The permanent set or "spring set" of the entire assembly cannot exceed 0.5 inch. The following variables impact the spring set in the following manner.

FIG. 2A illustrates the spring set ("S") measurement relevant to the ability of the retraction-biased extension unit to meet the AAR S-4006 standard. Assuming that the remainder of the railway hose support assembly does not vary in length during the S-4006 testing, this spring set S is to be no greater than 0.5 inch. With more particular reference to FIG. 2A, the uppermost of the two partial assemblies shown illustrates the free state of the retraction-biased extension unit, before any test load is applied. The lowermost assembly of FIG. 2A shows the length of the longitudinally compressible spring 42 after it is released from the fully compressed state when following AAR Standard S-4006.

The deflection angle of the legs of the spring wireform, shown at "A" in FIG. 4, is one of the variables, as discussed elsewhere herein. As this deflection angle increases, the spring set also increases.

The material of the internal spring wireforms has a modulus of elasticity. Typical material is steel, usually spring steel. If the variable of modulus of the elasticity increases, the spring set also increases. Thus, a greater modulus of elasticity enhances the ability of the retraction-biased extension unit to exhibit a spring set to maintain compliance with AAR-S4006 permanent set standards of 0.5 inch or less.

A further variable that affects the ability of the retraction-biased extension unit to exhibit a spring set that maintains the permanent set is the moment of inertia, which is dependent upon the cross-sectional area and geometry of the material, particularly of the internal spring wireform. As the wireform diameter increases, so does the moment of inertia. Accordingly, the cross-sectional area is a variable that increases the spring set as the cross-sectional area increases.

A further variable in this regard is the length of the leg of the spring wireforms, such as legs 59, 61 shown in FIG. 3. A leg length increase is a variable that decreases the spring set of the retraction-biased extension unit, negatively impacting the spring set.

There is a coefficient of friction between the internal spring wireforms and the longitudinally compressible spring. The materials of all of these components typically will be steel, usually spring steel. An increase in the coefficient of friction between the internal surface of the longitudinally compressible spring and the internal spring wireforms will increase the spring set provided by the retraction-biased extension unit.

A further variable affecting the spring set is the so-called spring rate of the longitudinally compressible spring. The spring rate indicates how much force is required to deflect the longitudinally compressible spring for a certain distance. An increase in the spring rate decreases the spring set of the retraction-biased extension unit.

While these variables affect the spring set of the retraction-biased extension unit, varying the angle "A" may be one of the most efficient ways of varying the spring set and of adjusting the damping that is provided by embodiments of the retraction-biased extension unit of the present railway hose support assembly. If this angle A is too small in the context of the particular retraction-biased extension unit design, no damping will be provided. Should the angle be too large and the legs exert too much force against the inner diameter of the longitudinally compressible spring, smooth operation will be inhibited. Additionally, if angle A is too large for a particular retraction-biased extension unit, the railway hose support assembly may not pass the AAR 5-4006 test due to inhibition of the ability of the longitudinally compressible spring to return to its original length, or at least the length to which it would return in the absence of interference from the internal spring wireforms.

Inasmuch as the railway hose support assembly is an all-metal device, difficulties encountered by assemblies that rely on polymeric straps that are susceptible to permanent elongation under loading, thereby requiring frequent length adjustments or replacement in order to maintain minimum height and retraction requirements. Also, being all metal, the railway hose support assembly is not subject to ultraviolet degradation when compared with units having polymeric components. The coupler link and hanger link components in embodiments of the railway hose support assembly facilitate installation when compared with hose support assemblies having prior wireform clips at these locations, and they also are less prone to breakage during uncoupling events. Embodiments of the railway hose support assembly of the present disclosure allow for simplified height adjustment and in general exhibit a longer lifespan than prior railway hose support assemblies.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A combination of a railway coupler, a railway hose glad hand and a railway hose support, comprising:
   a longitudinally compressible spring having a first end, a second end, and an inside surface;
   a first internal wireform positioned at least partially within the longitudinally compressible spring inside surface and having at least two legs meeting at a closed end, each leg having a free end spaced away from the closed end, each free end securely engaging the longitudinally compressible spring first end;
   a second internal wireform positioned at least partially within the longitudinally compressible spring inside surface having at least two legs meeting at a closed end, each leg having a free end spaced away from the closed end, each free end securely engaging the longitudinally compressible spring second end;
   the closed end of the first internal wireform is configured to be securely engaged with the railway coupler;
   the closed end of the second internal wireform is configured to be securely engaged with the railway hose glad hand; and
   the closed end of each of the first and second internal wireforms is accessible, whereby movement of the respective closed ends in opposite directions compresses the longitudinally compressible spring when a load is applied between the railway hose glad hand and the railway coupler, the combination of longitudinally compressible spring and internal wireforms being a retraction-biased extension unit having properties that maintain a spring set for supporting the railway hose glad hand, the properties being variables selected from the group consisting of deflection angle of the legs of the wireforms, modulus of elasticity of the wireforms, cross-sectional area of the wireforms, length of the legs of the wireforms, coefficient of friction between the spring wireforms and the longitudinally compressible spring, the spring rate of the longitudinally compressible spring, and combinations thereof
   a coupler link between an aperture of the railway coupler and the closed end of the first internal wireform; and
   a hanger link between the aperture of the hose glad hand and the second internal wireform, the hanger link having a loop configured to pass through the aperture of the glad hand and connect the hanger link with the glad hand.

2. The combination in accordance with claim 1, a wherein the hanger link is "pigtail" shaped and has another loop that threads through the second internal wireform and connects the hanger link with the second internal wireform.

3. The combination in accordance with claim 1, wherein the spring set of the retraction-biased extension unit is not greater than 0.5 inch.

4. The combination in accordance with claim 1, wherein at least one of the internal wireforms is a spring wireform that exhibits a deflection angle "A" that is at least 0.5°.

5. The combination in accordance with claim 4, wherein the angle "A" is between 1° and 10°.

6. The combination in accordance with claim 4, wherein the angle "A" is between 1.5° and 6°.

7. The combination in accordance with claim 4, wherein the angle "A" is between 2° and 4°.

8. The combination in accordance with claim 2, further including an adjustable spacer between at least one of said links and one of said closed ends of the first and second internal wireforms.

9. The combination in accordance with claim 1, wherein at least one of the internal wireform leg free ends is formed into a tight loop around a turn of the longitudinally compressible spring.

10. The combination in accordance with claim 1, wherein at least one of the internal wireforms includes a retainer loop between its closed end and its legs.

11. The combination in accordance with claim 10, wherein at least one of the internal wireforms has a stop that is between the closed end and the legs, the stop extends in a direction normal to a longitudinal axis of the retraction-biased extension unit.

12. The combination in accordance with claim 8, wherein the adjustable spacer is selected from the group consisting of a linked chain, a cable with a variable length, and a cable and stop assembly with a variable length.

13. A spring-style railway air brake hose support, comprising:
  a combination retraction-biased extension unit including:
    a longitudinally compressible spring having a first end, a second end, and an inside surface;
    a first internal spring wireform positioned at least partially within the compressible spring inside surface having at least two legs meeting at a closed end, each leg having a free end spaced away from the closed end, each free end securely engaging the longitudinally compressible spring first end;
    a second internal spring wireform positioned at least partially within the compressible spring inside surface having at least two legs meeting at a closed end, each leg having a free end spaced away from the closed end, each free end securely engaging the longitudinally compressible spring second end;
    the retraction-biased extension unit having properties that maintain a spring set for supporting a railway air brake hose glad hand, the properties being variables selected from the group consisting of at least one of the legs of at least one of the internal spring wireforms is biased outwardly at an angle "A" that is at least 0.5° with respect to a longitudinal axis of the retraction-biased extension unit, modulus of elasticity of the wireforms, cross-sectional area of the wireforms, length of the legs of the wireforms, coefficient of friction between the spring wireforms and the longitudinally compressible spring, the wring rate of the longitudinally compressible spring, and combinations thereof;
  a coupler link securely engaged with the closed end of the first internal spring wireform, the coupler link being configured to be secured to an aperture of a railway coupler;
  a hanger link securely engaged with the closed end of the second internal spring wireform, the hanger link being configured to be secured to an air brake hose glad hand aperture, the hanger link having a loop configured to pass through aperture of the glad hand and connect the hanger link with the glad hand; and
  whereby movement of the respective closed ends in opposite directions compresses the longitudinally compressible spring when a load is applied between the railway air brake hose and the railway coupler.

14. The railway hose support in accordance with claim 13, further including an adjustable spacer between at least one of said links and one of said closed ends of the first and second internal wireforms.

15. The railway hose support in accordance with claim 14, wherein at least one of the internal spring wireforms includes a retainer loop between its closed end and its legs.

16. The railway hose support in accordance with claim 14, wherein at least one of the internal wireforms has a stop that is between the closed end and the legs, the stop extends in a direction normal to a longitudinal axis of the retraction-biased extension unit.

17. A spring-style railway air brake hose support, comprising:
  a combination retraction-biased extension unit including:
    a longitudinally compressible spring having a first end, a second end, and an inside surface;
    a first internal spring wireform positioned at least partially within the compressible spring inside surface having at least two legs meeting at a closed end, each leg having a free end spaced away from the closed end, each free end securely engaging the longitudinally compressible spring first end;
    a second internal spring wireform positioned at least partially within the compressible spring inside surface having at least two legs meeting at a closed end, each leg having a free end spaced away from the closed end, each free end securely engaging the longitudinally compressible spring second end;
    the retraction-biased extension unit having properties that maintain a spring set for supporting a railway air brake hose glad hand, the properties being variables selected from the group consisting of at least one of the legs of at least one of the internal spring wireforms is biased outwardly at an angle "A" that is between 1.5° and 6° with respect to a longitudinal axis of the retraction-biased extension unit, modulus of elasticity of the wireforms, cross-sectional area of the wireforms, length of the legs of the wireforms, coefficient of friction between the spring wireforms and the longitudinally compressible spring, the spring rate of the longitudinally compressible spring, and combinations thereof;
  a coupler link securely engaged with the closed end of the first internal spring wireform, the coupler link being configured to be secured to a railway coupler;
  a hanger link securely engaged with the closed end of the second internal spring wireform, the hanger link being configured to be secured to an air brake hose glad hand aperture, the hanger link having a loop configured to pass through the aperture of the glad hand and connect the hanger link with the glad hand;
  an adjustable spacer between at least one of said links and one of said closed ends of the first and second internal spring wireforms, the adjustable spacer being selected from the group consisting of a linked chain, a cable with a variable length, and a cable and stop assembly with a variable length; and
  whereby movement of the respective closed ends in opposite directions compresses the longitudinally compressible spring when a load is applied between the railway air brake hose and the railway coupler.

18. The railway hose support in accordance with claim 17, wherein at least one of the internal spring wireforms includes a retainer loop between its closed end and its legs.

19. The railway hose support in accordance with claim 17, wherein at least one of the internal wireforms has a stop that is between the closed end and the legs, the stop extends in a direction normal to a longitudinal axis of the retraction-biased extension unit.

20. The railway hose support in accordance with claim 17, wherein the closed end of at least one of the internal spring wireforms extends beyond one of the ends of the longitudinally compressible spring.

21. A method of suspending a railway hose from a railway coupler, a railway hose glad hand and a railway hose support, comprising:

providing a longitudinally compressible spring having a first end, a second end, and an inside surface;

positioning a first internal wireform at least partially within the longitudinally compressible spring inside surface and having at least two legs meeting at a closed end, each leg having a free end spaced away from the closed end, each free end securely engaging the longitudinally compressible spring first end;

positioning a second internal wireform at least partially within the longitudinally compressible spring inside surface having at least two legs meeting at a closed end, each leg having a free end spaced away from the closed end, each free end securely engaging the longitudinally compressible spring second end thereby forming a retraction-biased extension unit from the longitudinally compressible spring and the wireforms, the retraction-biased extension unit having properties that maintain a spring set for supporting the railway hose glad hand, the properties being variables selected from the group consisting of deflection angle of the legs of the wireforms, modulus of elasticity of the wireforms, cross-sectional area of the wireforms, length of the legs of the wireforms, coefficient of friction between the spring wireforms and the longitudinally compressible spring, the spring rate of the longitudinally compressible spring, and combinations thereof;

securing, directly or indirectly, the closed end of the first internal wireform to a railway coupler;

providing a hanger link having a loop and securing a portion of the hanger link to the closed end of the second internal wireform, and threading the loop of the hanger link through an aperture of a railway hose glad hand, thereby connecting the retraction-biased extension unit to the railway hose glad hand; and longitudinally compressing the longitudinally compressible spring by movement of the respective closed ends in opposite directions when a load is applied between the railway hose glad hand and the railway coupler.

22. The method in accordance with claim 21, further including providing a coupler link and attaching the first internal wireform to an aperture of the railway coupler for securing the retraction-biased extension unit to the railway coupler.

23. The combination in accordance with claim 1, wherein the hanger link loop is laterally separated at an access opening configured to accommodate loop passage through the aperture of the glad hand.

* * * * *